April 7, 1942.   G. RODLI ET AL   2,278,948
SURFACE MARKING APPARATUS
Filed March 22, 1939   4 Sheets-Sheet 1

Inventors
Gilbert Rodli and
Rufus W. Wilson.

By Karl W. Flocks
Attorney

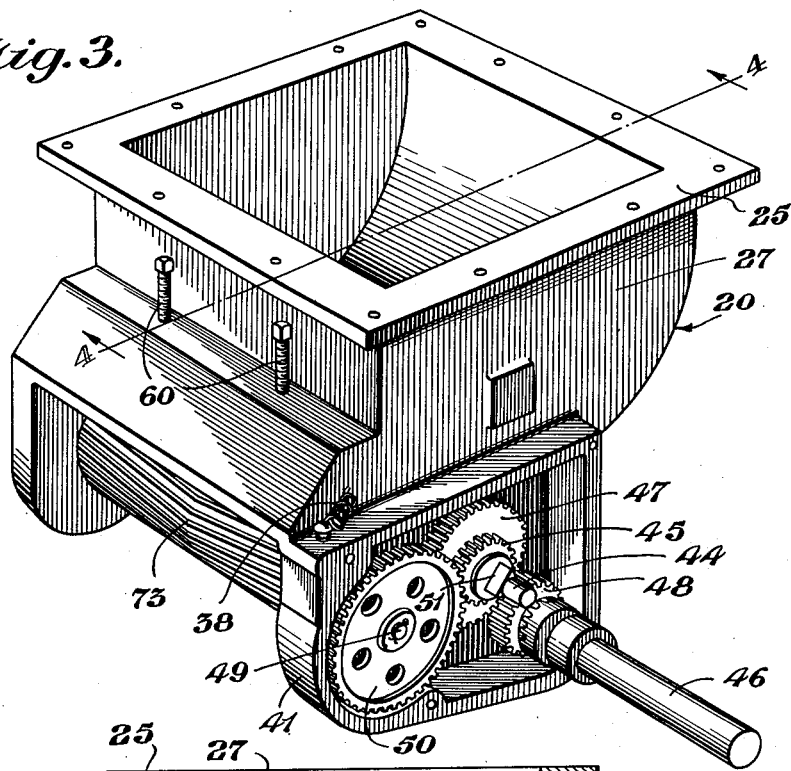
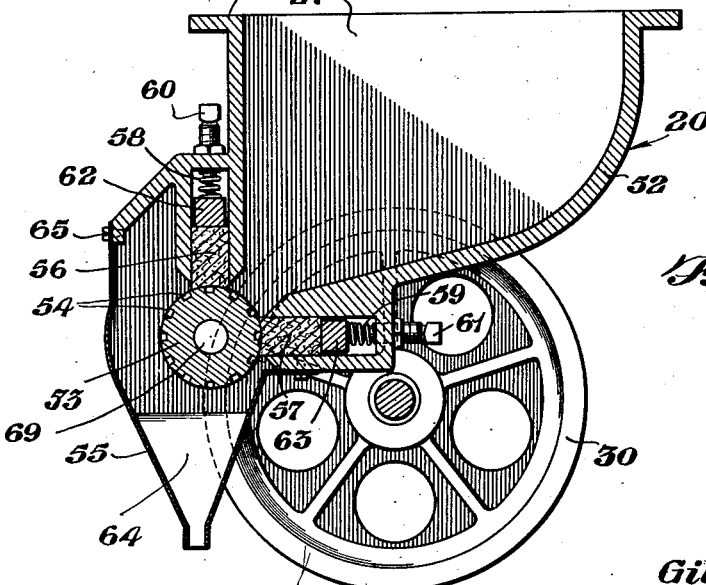

April 7, 1942.   G. RODLI ET AL   2,278,948
SURFACE MARKING APPARATUS
Filed March 22, 1939   4 Sheets-Sheet 3
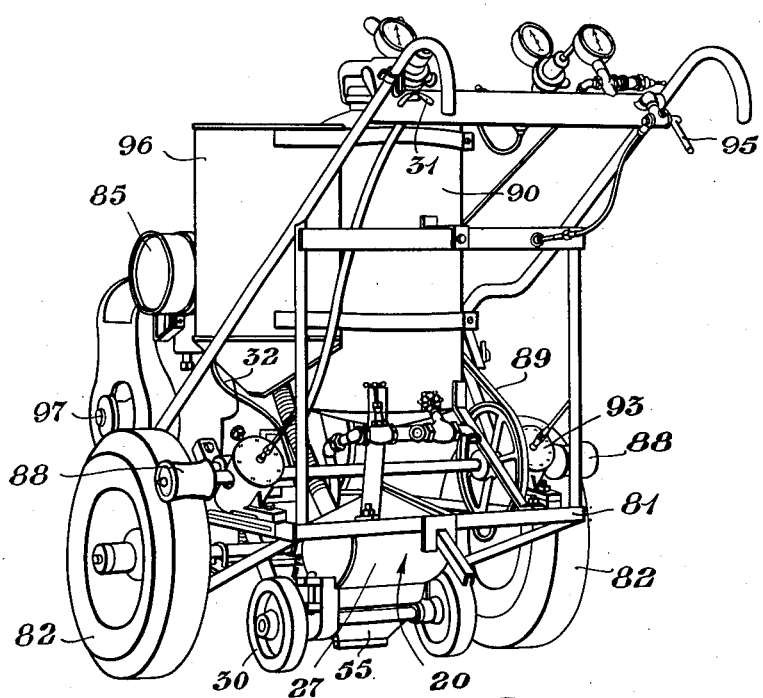
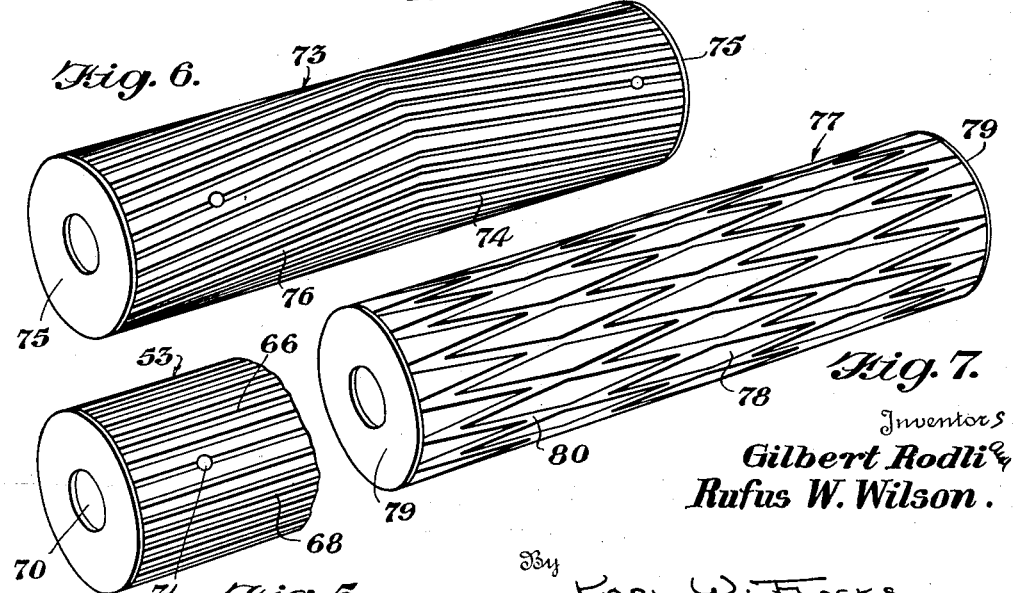
Inventors
Gilbert Rodli &
Rufus W. Wilson.
By Karl W. Flocks
Attorney April 7, 1942.  G. RODLI ET AL  2,278,948
SURFACE MARKING APPARATUS
Filed March 22, 1939  4 Sheets-Sheet 4

Inventors
Gilbert Rodli and
Rufus W. Wilson.

By KARL W. FLOCKS
Attorney

Patented Apr. 7, 1942

2,278,948

UNITED STATES PATENT OFFICE 2,278,948

SURFACE MARKING APPARATUS

Gilbert Rodli and Rufus W. Wilson, Huntingdon, Pa., assignors, by mesne assignments, to Prismo Holding Corporation, New York, N. Y., a corporation of New York Application March 22, 1939, Serial No. 263,548

5 Claims. (Cl. 91—12)

This invention relates to surface and road marking apparatus and more particularly to apparatus for the fabrication of surface lines incorporating autocollimating units, such as glass or plastic spheres, quartz, or other granular material, and binders such as paint and the like.

The significant part played by road markings, such as center lines, and lane margin lines, for example, in promoting safety on the highway has been widely recognized by state road officials and the utilization thereof on modern roadways has become universal. During the day the markings are clear and the observation thereof by the driver of a motor car on a highway incorporating a road marking presents no particular problem as long as the lines are fresh and well defined, that is, not obliterated by traffic. At night, however, when the lines are most needed, the part played by the road marking, as compared with the daytime, will be relatively small unless the reflection characteristics inherent therein are good.

Various expedients are depended upon to effect satisfactory surface markings among which are simply paint of different colors, such as for example, white and yellow which are most common; paint plus pumice to increase the reflection efficiency of the marking; metal foil; white or colored concrete; relatively large reflector buttons fabricated of glass or synthetic material anchored at spaced intervals; and paint incorporating glass spheres of microscopic size.

Road markings comprising simply white or colored paint, as has been stated, serve to reflect and diffuse light measurably, but the disadvantages of such simple marking comprise that of short life under normal traffic conditions, and improper reflection. The reflection of the light from the head lamps of a car traveling in one direction to the eyes of the driver of a car approaching from the opposite direction tends to blind the latter, the angle of incidence being equal to the angle of reflection. The diffusion serves to cause a relatively small portion of the light from the head lamps of the driver's car to be returned to him as compared with road markings incorporating autocollimating units, as will be later described.

Road markings including pumice as well as paint while not entirely satisfactory have shown a tendency to be longer lived than markings comprising simply paint and to have increased reflection characteristics; that is, to throw a greater proportion of the light from the head lamps of the driver's car back to the driver in order that the marking may appear clear and well defined to him.

The disadvantages inherent in white or colored concrete are similar to those recited above and include that of short life as the concrete soon becomes dirty, serving no longer as a road marking until freshened with paint. The first cost is usually high as is the case when relatively large reflector buttons fabricated of glass or synthetic material are anchored at spaced intervals. While these buttons efficiently reflect light in a desirable manner, their cost and expense of installation is prohibitively high for universal installation.

It is an object of the invention to provide an apparatus for the laying of a marker including a binder and autocollimating units which is simple to operate and serves to effectively distribute the units over the binder in a manner to effect relatively high autocollimating efficiency and long life of the marker.

It is a further object of the invention to teach the dispensing of spherical grains in a manner to effect proper distribution in accordance with various conditions.

Other objects and the nature and advantages of the invention will be apparent from the following description taken in conjunction with the accompanying drawings, wherein:

Fig. 3 is a view in perspective of the dispenser with the storage tank, feed spout and g  r box cover plate removed;

Fig. 4 is a view in section taken along line 4—4 of Fig. 3 and looking in the direction of the arrows;

Fig. 5 is a fragmentary perspective view of a rotor having grooves parallel to the axis of the said rotor;

Fig. 6 is a view in perspective of a herringbone rotor;

Fig. 7 is a view in perspective of a rotor having on its surface a diamond shaped pattern;

Fig. 8 is a view in perspective of a self propelled marking apparatus;

Figures 1, 2:
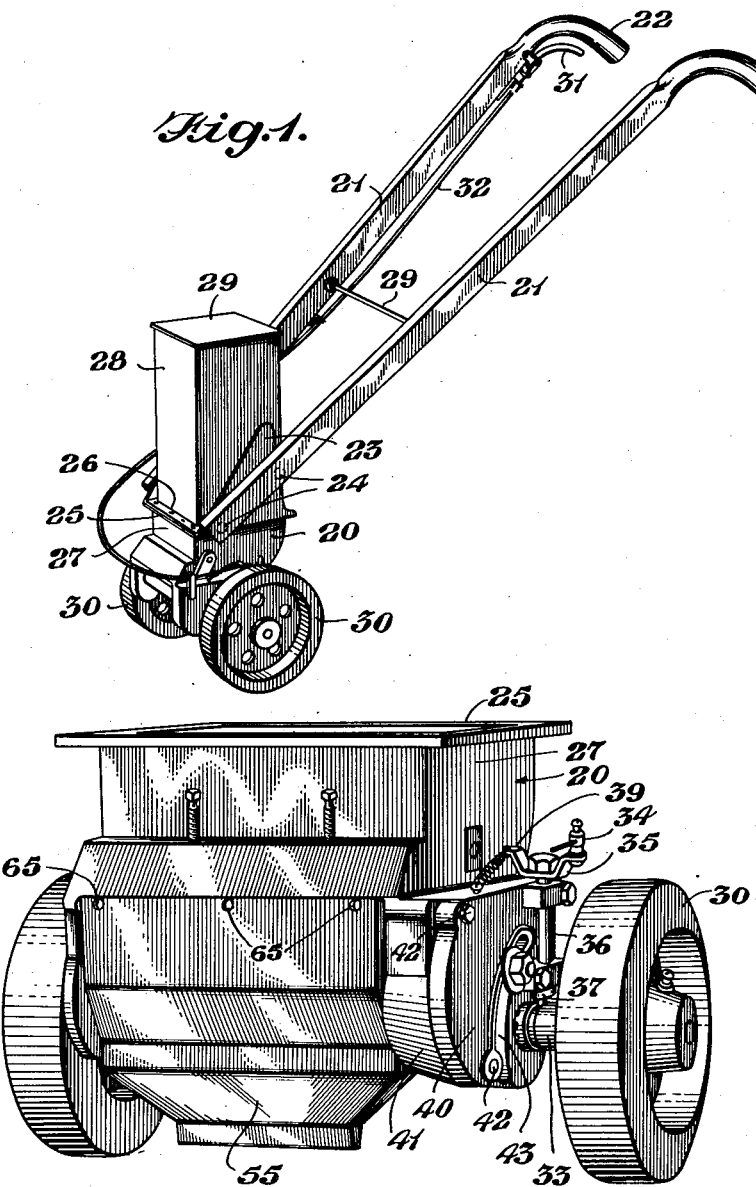
Fig. 1 is a view in perspective of a hand propelled dispenser in accordance with the invention.
Fig. 2 is a view in perspective of a dispenser with the storage tank and other parts removed.

Referring to Fig. 1, a hand propelled dispenser 20 may comprise a pair of upwardly and rearwardly extending arms 21 formed with bent handle portions 22 at their respective ends. The lower portions of the respective arms 21 are secured to the dispenser 20 through the medium of supporting ears 23 as by bolts, rivets or other fastening means 24, which ears 23 are secured to the flanges 25 and 26 of the casing 27 and storage container 28, respectively. The arms 21 may be braced intermediate of their ends by the rod 29 as illustrated. The container 28 comprises a cover 29 and is adapted to receive and store autocollimating units such as glass spheres, spheres of synthetic material, quartz, or any other dry granular material.

The dispenser 20 is adapted to be supported above the surface to receive the autocollimating units by a pair of wheels 30 which may comprise tires of any suitable material such as solid rubber tires, or pneumatic tires. A control lever 31 may be arranged in association with one of the bent handle portions 22 for controlling the dispenser 20 in accordance with the actuation of said handle by the operator. Motion imparted to the lever 31 may be transmitted to the control apparatus of the dispenser 20 by the flexible connector 32.

Operation of the dispensing mechanism, later to be described, is effected by lateral movement of the dispenser 20 causing rotation of the rubber tired driving wheels 30 which are in frictional engagement with the surface to be marked. Rotation of the mechanism within the casing 27 is effected only when the half clutch coupling 33 is engaged, which engagement is brought about by actuation of the operating lever 31 and transmission of motion through flexible connector 32 to the terminal 34, see Fig. 2, on the clutch arm 35 associated with clutch arm pin 36, causing rotation thereof and cam 37 secured to the lower end of pin 36, which cam engages the clutch coupling. Upon release of the operating member 31, the clutch spring 38 secured to the opposite end 39 of clutch arm 35 will cause rotation of the clutch arm pin in the opposite direction, thereby disengaging the half clutch coupling 33.

The gear box cover 40 is removably secured to the gear box portion 41 of the casing 27 by screws 42 and has an arcuate slot 43 formed therein providing for the adjustment of intermediate gear stud shaft 44 to correspond to various sizes of compound gear 45, see Fig. 3, whereby various speeds and corresponding distribution of material to be dispensed may be effected.

With the half clutch coupling 33 engaged, lateral movement of the dispenser 20 will effect rotation of the drive shaft 46 upon which the wheels 30 are normally mounted and rotation will be imparted to the large gear 47 of the compound gear 45 by the meshing drive gear 48 and finally motion will be imparted to the rotor shaft 49 by the driven gear 50 which meshes with the small gear 51 of the compound gear 45.

The hopper portion 52 of the casing 27 is formed of such contour as to naturally direct autocollimating units, or other material to be dispensed, to the surface of the rotor 53 which is formed with a series of receiving grooves 54 sealed from the feed spout 55 by the felt brushes 56 and 57, respectively. Each brush is adapted to be adjusted with regard to compression in relation to the surface of the rotor 54 by means of the springs 58 and 59 and adjusting screws 60 and 61, respectively. The springs 58 may be either of the flat leaf or coil type and arranged to engage metal stiffener bars 62 and 63, respectively, which in turn effect the proper compression on the hard glazed felt strips 56 and 57, respectively.

Formed within the lower portion of the feed spout 55 which is secured to the casing 27 by screws 65, is a plurality of baffles so spaced as to effect the proper distribution of the material or units to be dispensed.

The feed spout 55 as illustrated is preferably fabricated of sheet metal but it is to be understood that it is within the scope of the invention to cast or mold same and that the number and size of the vanes or baffles may be varied as desired.

Referring to Fig. 5, a rotor 55, which may be fabricated of metal, comprises a cylindrical body portion 66 and two end plates 67 closing the U-shaped open end portions of the grooves 68 which are of a size depending upon the units to be dispensed. The rotor shaft 69 is adapted to pass through the bore 70 and the body portion 66 of the rotor 53. Copper or raw hide shear pins are passed through holes 71 and 72 which are arranged transversely of the axis of the rotor and adapted to register with corresponding holes, not shown, through shaft 69, which latter holes are formed perpendicular to the axis of said shaft. Should for any reason the rotor be prevented from rotating because of jamming of the material or units to be dispensed or otherwise, the shear pins are adapted to be the first to fail, thereby preventing injury to the rotor and the remainder of the dispenser 20.

In the marking of roadways, football gridirons, baseball diamonds, recreation grounds, warehouses, storage and parking lots and garages, aviation fields and industrial plants, certain types of apparatus have been devised to concentrate paint along the center of the line gradually thinning out toward its margins. As the life of the line or mark may be said to be a function of the number of partially embedded autocollimating units on its surface, when the units are glass spheres, it may be desirable in certain instances to concentrate a number of units distributed over the line along the center of same for the center having more binder or paint may hold a greater number of units securely. Now it is not always desirable to cover the entire surface of the mark or line, for to do so may involve increased expense by reason of the cost of additional material with no corresponding increase in reflection efficiency.

Accordingly, a herringbone rotor 73, see Fig. 6, may be incorporated in the dispenser 20 in place of the rotor 53, which rotor 73 is so formed as to concentrate the number of units dispensed along the center of the line, yet distributing a proper amount of the units over all portions of the line to effect a finished marker of desired life and reflection characteristics. The rotor 73 may comprise a body portion 74 and end plates 75 to close the U-shaped open portions of the grooves or slots 76, the side and bottom walls of which may approximate a dimension of one-sixteenth of an inch when glass spheres of a diameter ranging from five to forty thousandths of an inch are to be dispensed. The grooves 76 may be five-sixteenths of an inch out of parallel with the axis of the rotor for every three inches length of same.

For effecting still other distributions depending on the character of the binder which is to be utilized in association with the units dispensed, a rotor 77, see Fig. 7, may be substituted for the rotor 53 illustrated in Fig. 4. This rotor comprises a cylindrical body portion 78 having two end plates 79 covering the open end portions of the grooves 80 which are so arranged out of parallel with the axis of the rotor as to effect a diamond shaped pattern on the surface thereof. The distribution effected by this type rotor has been found to give markedly high quality reflection and long life to a marker or line fabricated with a dispenser incorporating this rotor.

In accordance with our invention, not only may the dispenser 20 comprise a unitary device adapted to be run over a mark or line which has been freshly covered with a binder such as paint for example, but our invention may be so combined with a marking or striping machine and so related thereto as to effect substantially simultaneous striping and embedding of the fresh strip with autocollimating units. In other words, the apparatus substantially fabricates a mark or line comprising a binder having embedded therein a series of autocollimating units in accordance with a predetermined plan of distribution.

Figure 9:
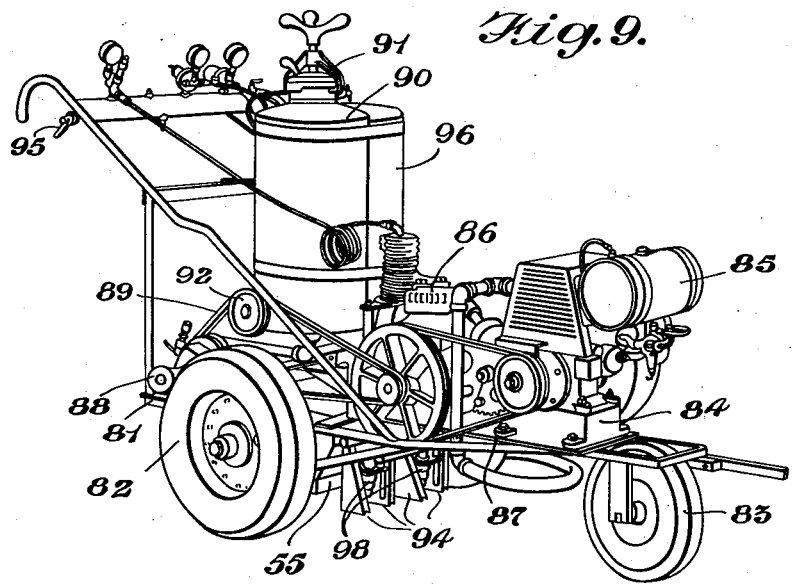
Fig. 9 is a view similar to Fig. 8 but taken more generally from the forward portion of the machine; and, Fig. 10 is a schematic illustration of a speed control device utilized in conjunction with the embodiment illustrated in Figs. 8 and 9.

Referring to Figs. 8 and 9, the road marker or striper may comprise a frame 81 supported by a pair of pneumatic tired driven wheels 82 and a smaller pneumatic tired front wheel 83. At the forward portion of the frame, the air cooled engine 84 receiving its fuel from tank 85 is adapted to drive the air compressor 86 through the medium of belt 87 and in turn driving pulleys 88 by means of belt 89. The paint tank 90 may comprise a clamped-on cover 91. Compressed air supplied by compressor 86 is utilized first, to place the proper head pressure upon the fluid paint or binding material within the tank 90; second, to cause the driving pulleys 88 through the medium of control motors 93 to engage the surface of the pneumatic tired wheels 82 effecting propulsion of the entire mechanism. A marker or line having a relatively even margin is effected by causing the engine exhaust gas to be discharged from nozzles 94, which discharged gas acts as margin forming curtains.

Control valve 95 in the air line is located near the upper portion of the right upwardly and outwardly extending arm where it may be handy to the operator of the machine. The operating lever 31 is located adjacent the upper portion of the left arm and through the medium of flexible connector 32, best shown in Fig. 1, effects control of the dispensing of autocollimating units. Various gauges, controls, belt adjustment, and other auxiliary devices are incorporated in the mechanism but form no part of the instant invention. The container 96 is adapted to receive and store the autocollimating units in a manner corresponding to the container 28 illustrated in Fig. 1, and is graduated on its interior whereby the quantity of the material to be dispensed or stored therein may be accurately determined. A flexible metal hose 97 connects the lower portion of the container 96 with the upper portion of the casing 27 of the dispenser 20. The paint distributing nozzle 98 located between air curtain forming nozzles 94 is directly in front of and in line with autocollimating unit dispensing spout 55.

In operating the device illustrated in Figs. 8 and 9, the paint tank 90 and autocollimating unit storage receptable 96 are each filled to desired level to effect a predetermined ratio of distribution. With the machine arranged in proper alignment and with provision made for it continuing in such alignment which may be ascertained by trial from observation of an extending arm from the front portion of the machine, the operator may effect such movement of the compressed air control valve 95 as to effect a drive through to the wheels 82 causing motion of the machine laterally and simultaneously spraying of the surface to be marked or lined which motion indirectly causes rotation of the wheels 30, as described, effecting rotation of the rotor 53 and consequent dispensing of the autocollimating units or other material to be dispensed in accordance with a predetermined pattern. The dispensing of the autocollimating units may be controlled independently of the application of the paint or binding material within the storage tank 90 by means of operating lever 31 as already described.

In the arrangement illustrated, the line including the binder and incorporated autocollimating units may be applied continuously or intermittently upon any horizontal plane or any plane at variance with the horizontal up to as much as 88° and on any curve on such plane. Not only may the finished line be the continuous or intermittent but the pattern of the autocollimating units in the binder may be controlled to effect predetermined distributions and not only may straight-fluted, herringbone and diamond rotors be utilized within the casing 27 but spiral, cupped and other depressed patterns depending on the class and grade of the granular materials to be discharged heterogeneously or uniformly are to be considered as within the scope of the invention.

Figure 10:
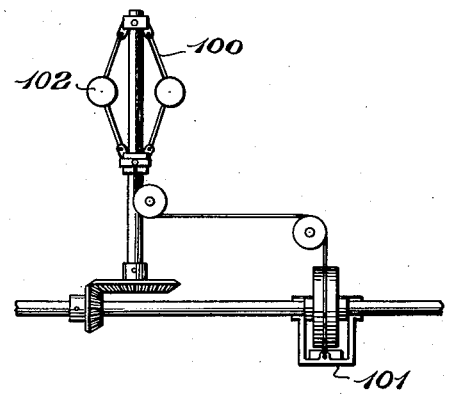

While the embodiments of the invention illustrated have been found to be satisfactory, yet for certain purposes it may be desired that greater accuracy of distribution and the relation between the dispensing of the granuar material or autocollimating units over the binder or paint be effected. For example, when the spray type of marker is combined with the dispensing apparatus 20, variations in grade may effect varied results unless the operator is careful to adjust the device for uniform speed for in that type of arrangement the quantity of binder or paint dispensed is proportional to the velocity whereas the quantity of granular material or autocollimating units dispensed is merely proportional to the distance traveled. Accordingly, it is to be understood that it is within the scope of our invention to provide a control device 99 with a governor 100 and brake mechanism 101 illustrated diagrammatically in Fig. 10 such that when the machine traveling down hill, reaches a predetermined maximum speed, the governor balls 102 will fly out and apply the brake mechanism 101; and when the speed of the mechanism is below a predetermined minimum the balls will be at a minimum from the center of rotation effecting release of the brake and consequently providing for an increase in speed up to the maximum whereby a more uniform velocity of the mechanism is effected. Other forms of speed control devices may be utilized, such as that comprising a driving friction pulley which may be moved over the surface of a driven rotating disc in accordance with the change in distance from the center of rotation, that a fly ball will make in response to the speed of the machine. Still other means may be employed to effect the proper relation between the distribution of the granular or autocollimating units and the application of the binding material or paint.

It is conceivable that the combined binder and granular material dispenser have no means of propulsion and be associated with an automobile or truck either at its rear or at the side of the runningboard or be adapted to be propelled by manual effort. Not only may the paint applicator be of the spray type but it may be applied by brush or by flowing the same on the surface to be marked or lined or by other suitable means. Further, the paint may be applied by flowing same on to a roller which engages the surface to be marked. When the spray type of paint applicator is utilized, other means than air curtains may be employed to effect neat margins for example, rotating baffle discs may be used for this purpose.

It is to be understood that not only may the dispenser be operated through connection with the rubber tired wheels as described, but any other suitable device may be utilized, such as for example, a belt or chain drive connected to the striper operating mechanism or any other associated power containing mechanism.

It is further to be understood that the dispenser may be placed in operable position by other means than the flexible cable and clutch control system set forth heretofore in this specification, for example, a rod may be connected to the back of the dispenser by which that device may be raised off the road and lowered onto the road in order to control the discharge and the autocollimating units.

It will be obvious to those skilled in the art that various changes may be made in this device without departing from the spirit of the invention and therefore the invention is not limited to what is shown in the drawings and described in the specification but only as indicated in the appended claims.

We claim:

1. In line striping apparatus of the character adapted to fabricate an autocollimating marker on a surface to be marked, the marker comprising a reflecting binder and autocollimating units partially embedded in said binder so that approximately the lower halves thereof are within the reflecting binder and approximately the upper halves thereof are exposed so as to form a light entering surface, said apparatus comprising: a wet binder applicating means for fabricating a reflecting base of predetermined film thickness correlated to the size of said autocollimating units and including outer margin forming means for forming the outer margins of said marker whereby its width will be determined, an autocollimating unit dispenser comprising casing walls and a grooved measuring rotor located therein, said rotor having its axis disposed transversely of the marker to be formed, and a spout in operative association with said rotor and having walls forming a bottom opening facing the surface to be marked, wheeled frame means for supporting said applicating means and said dispenser, said dispenser being arranged to the rear of said applicating means in alignment therewith and within the longitudinal projection of said margin-forming means, the grooves of said rotor each being separated from each other by the walls forming the said grooves, the grooves extending in a direction generally axially of the rotor and the length of the grooved area of the rotor corresponding to the width of the marker loaded with autocollimating units, means for moving said apparatus along said surface to be marked and turning said rotor while correlating the speed of rotation of said rotor to the speed of said apparatus so that the units will be sufficiently spaced along the longitudinal axis of the marker whereby the autocollimating effect of the marker as a whole will be efficient.

2. The structure recited in claim 1, said spout walls forming said discharge opening facing the surface to be marked being relatively long and narrow with the opening having its major axis parallel to the axis of said rotor, a plurality of vertically disposed baffles in said spout arranged transversely of the major axis of the discharge opening in said spout.

3. The structure recited in claim 1, said margin forming means including means for effecting compressed gaseous curtains, and said rotor being grooved in a generally herringbone pattern.

4. The structure recited in claim 1, said applicator comprising means for applying said binder to said surface to be marked in a manner to effect varying thickness thereof in transverse section, said dispenser including means to dispense a greater quantity of autocollimating units where the binder is thicker and a lesser quantity where the binder is thinner.

5. The structure recited in claim 1, and resilient sealing means contacting the walls of said dispenser casing and said rotor whereby the grooves which are being loaded with autocollimating units will be efficiently sealed from those which are discharging their autocollimating units.

GILBERT RODLI.
RUFUS W. WILSON.